US 6,615,582 B2

(12) United States Patent
Yamamoto et al.

(10) Patent No.: US 6,615,582 B2
(45) Date of Patent: Sep. 9, 2003

(54) ROTATOR SUPPORTABLE AT SIDE SURFACE THEREOF BY NEEDLE BEARING

(75) Inventors: Norihiro Yamamoto, Shizuoka-ken (JP); Tsutomu Kawai, Shizuoka-ken (JP)

(73) Assignee: NSK - Warner K.K., Tokyo (JP)

( * ) Notice: Subject to any disclaimer, the term of this patent is extended or adjusted under 35 U.S.C. 154(b) by 0 days.

(21) Appl. No.: 09/987,368

(22) Filed: Nov. 14, 2001

(65) Prior Publication Data

US 2002/0056274 A1 May 16, 2002

(30) Foreign Application Priority Data

Nov. 14, 2000 (JP) ........................................ 2000-346460

(51) Int. Cl.$^7$ ............................................. F16H 41/30
(52) U.S. Cl. ..................................... 60/345; 192/113.32
(58) Field of Search .............. 60/339, 345; 192/113.32, 192/113.36

(56) References Cited

U.S. PATENT DOCUMENTS 5,676,230 A * 10/1997 Awaji et al. .................. 60/345

* cited by examiner

*Primary Examiner*—Edward K. Look
*Assistant Examiner*—Thomas E. Lazo
(74) *Attorney, Agent, or Firm*—Crowell & Moring LLP (57) ABSTRACT

Disclosed is a rotor supportable at a side surface thereof by a needle bearing. The side face includes a bearing face with lubricating oil grooves formed therein, and is to be brought into contact with the needle bearing upon assembly. The oil grooves are arranged in a positional relation ship with needles of the needle bearing such that the oil grooves and the needles of the needle bearing do not completely overlap each other along an entire circumference in a direction of rotation. The rotor can be a bush for a one-way clutch, an inner peripheral portion of a stator of a torque converter, or an outer ring of a one-way clutch, said outer ring also serving as an inner peripheral portion of a stator of a torque converter. Preferably, the oil grooves may each be provided with a groove part extending substantially in a direction of a tangent to a raceway circle for said needles.

8 Claims, 8 Drawing Sheets

ROTATOR SUPPORTABLE AT SIDE SURFACE THEREOF BY NEEDLE BEARING

BACKGROUND OF THE INVENTION a) Field of the Invention

This invention relates to a rotor supportable at a side surface thereof by a needle bearing.

b) Description of the Related Art

Figure 12:
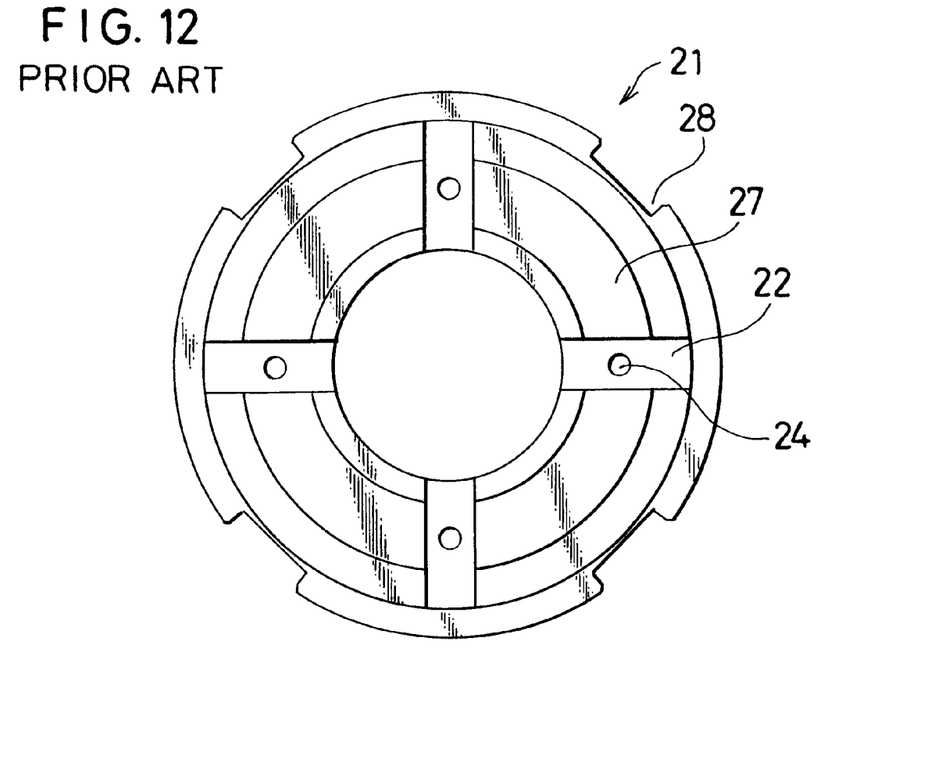
FIG. 12 is a front view of a conventional rotor.
Figure 13:
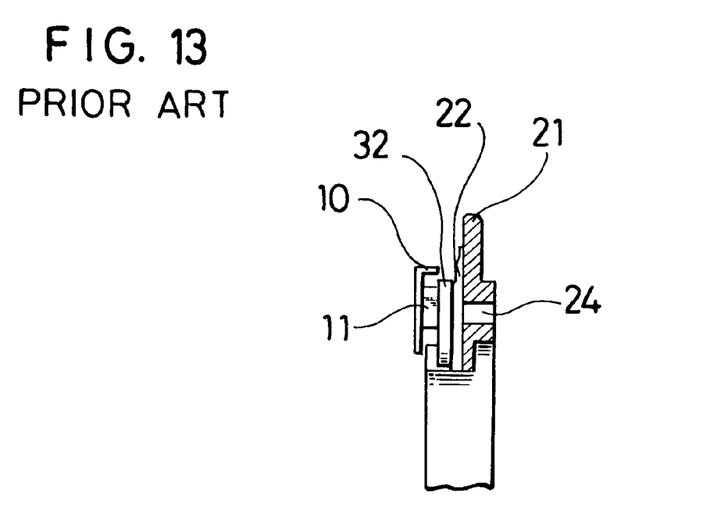
FIG. 13 is an axial fragmentary cross-sectional view of the conventional rotor.

FIG. 12 onwards show the construction of a conventional rotor. In these drawings, the conventional rotor is illustrated by way of example as being used as a bush for a one-way clutch (hereinafter simply called "bush") upon bringing the one-way clutch into contact at a side surface thereof with a needle bearing. FIG. 12 is a front view of the bush, and FIG. 13 is an axial fragmentary cross-sectional view of the bush. The bush, which is designated at numeral 21, has a bearing face 27 to be brought into contact with a needle bearing 10. The bearing face 27 is provided with oil grooves 22, and oilways 24 are axially bored in the respective oil grooves 22. The bush 21 is also provided at an outer periphery thereof with indentations 28 to be fitted with an outer ring (not shown) of the one-way clutch.

Designated at numerals 10, 11 and 32 are the needle bearing, needles, and a race of the needle bearing, respectively, and load from a stator of a torque converter is borne by these needle bearings.

Figure 14:
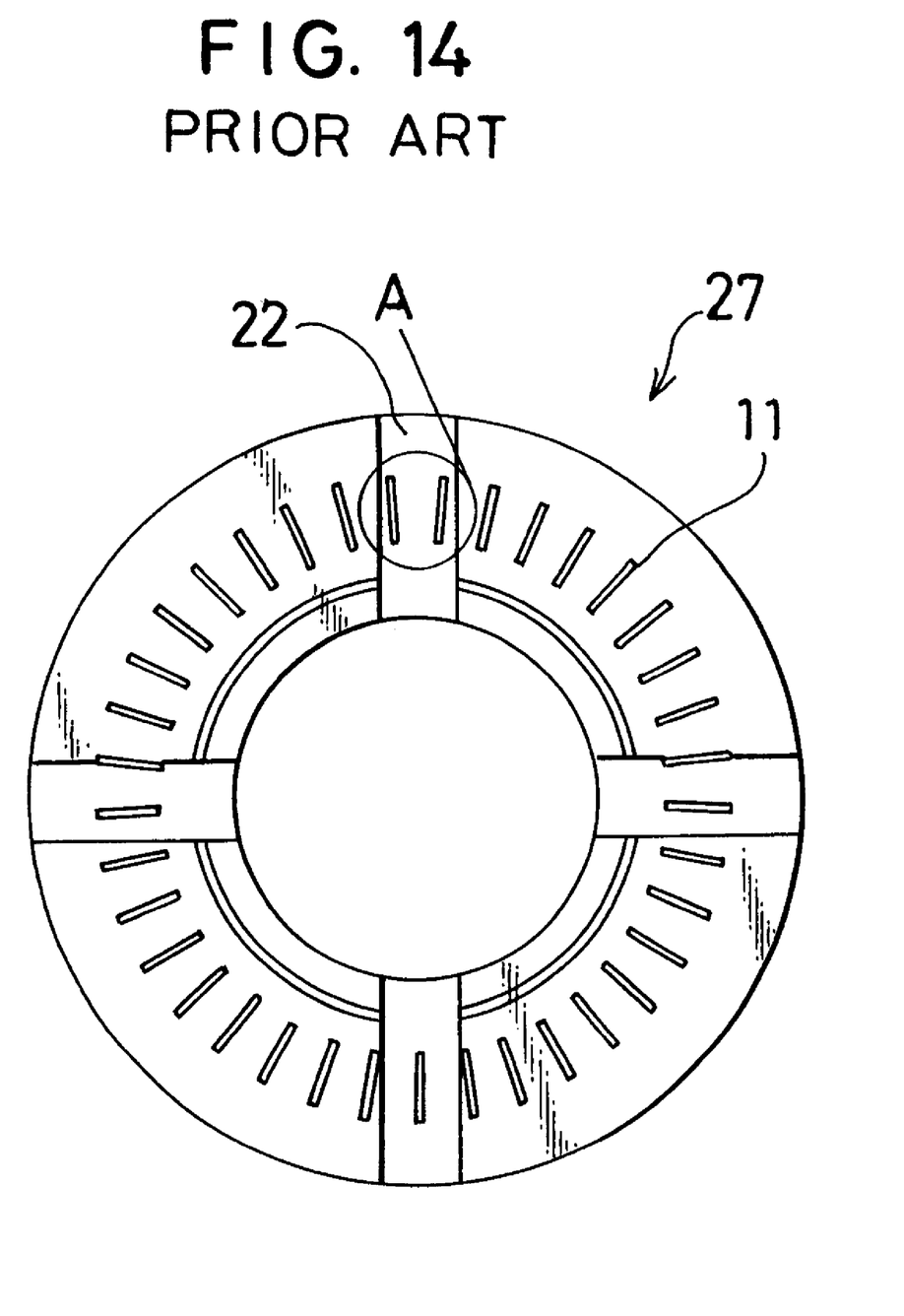
FIG. 14 is a diagram showing a positional relationship between oil grooves in the conventional rotor and needles.

FIG. 14 is a diagram showing a conventional positional relationship between the oil grooves 22 in the bearing face 27 and the needles 11. As is appreciated from the drawing, the needles 11 and the oil groove 22 are completely overlapping in an area indicated by a circle A.

Keeping in step with a move toward high-powered engines, the load produced from the stator of the torque converter has increased, leading to an increase in the load borne by the bearing face 27. This has also led to an increase in the load transmitted from the needles 11 to the bearing face 27 via the race 32. Because the needles 11 completely overlap the grooves 22 as mentioned above, the race 32 yields and caves into the oil grooves 22 under the load from the needles 11. As greater contact pressures occur between the caved portions of the race 32 and the needles 11, a problem arises in that the needles 11 may eventually undergo flaking after repeatedly passing over the caved portions. To avoid this caving, it has heretofore been needed to assure the rigidity of the race by making it thicker or applying heat treatment to it.

SUMMARY OF THE INVENTION

An object of the present invention is to prevent a race of a needle bearing from yielding and caving into oil grooves of a rotor maintained in contact with the needle bearing and also to achieve reductions in the thickness, weight and manufacturing cost of the race, both, without making the race thicker or applying heat treatment or the like to the race.

In one aspect of the present invention, there is thus provided a rotor supportable at a side surface thereof by a needle bearing, said side face including a bearing face with lubricating oil grooves formed therein and being to be brought into contact with the needle bearing upon assembly, wherein the oil grooves are arranged in a positional relation ship with needles of the needle bearing such that the oil grooves and the needles of the needle bearing do not completely overlap each other along an entire circumference in a direction of rotation.

Owing to the above-described construction, the rotor according to the present invention can prevent a race of the needle bearing from yielding and caving into the oil grooves formed in the bearing face under load from the needles, can make the race smaller in thickness and lighter in weight, and can achieve a cost cut.

DETAILED DESCRIPTION OF THE INVENTION AND PREFERRED EMBODIMENTS

In each of the embodiments of the present invention, each groove is formed in such a way that it has a groove part extending in the direction of a tangent to a raceway circle of needles. As the raceway circle, a circle drawn by connecting substantially central portions of the needles between their outer ends and inner ends should be used as a standard. By arranging each oil groove in such a form, it is possible to prevent the oil grooves and the needles from completely overlapping each other along the entire circumference in the direction of rotation.

Figure 1:
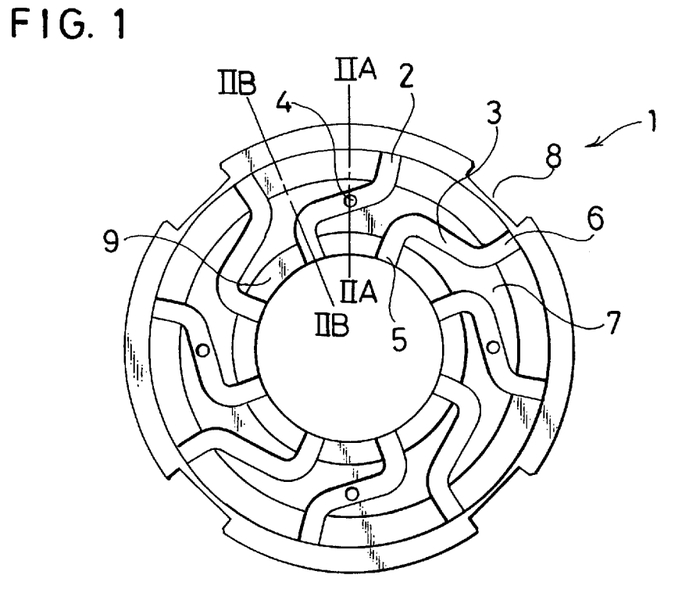
FIG. 1 is a front view of a rotor according to a first embodiment of the present invention.

The rotor according to the first embodiment of the present invention as illustrated in FIG. 1 is a bush suitable for arrangement in a side wall of a one-way clutch. Lubricating oil grooves 2 are formed in a bearing face 7 of the bush 1.

Each of these oil grooves 2 is in such a form that an inlet part 5 extending in a radial direction, a middle part 3 extending in the direction of a tangent to a needle raceway circle drawn by connecting central portions of associated needles, and an outlet part 6 are connected together. Every second oil groove 2 is provided at the middle part 3 thereof with an axially-extending oilway 4 and at an outer periphery thereof with indentations 8 to be fitted on an outer ring (not shown).

Figure 2A:
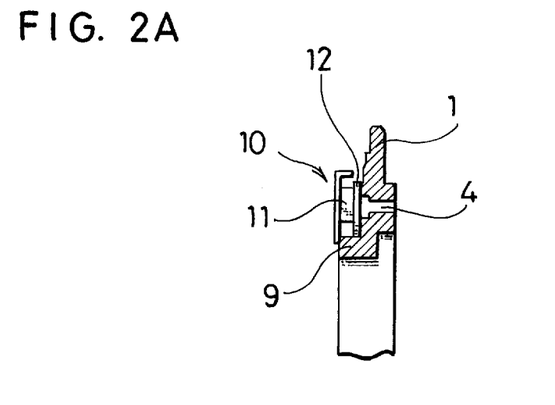
FIG. 2A is an axial fragmentary cross-sectional view of the rotor of FIG. 1, as viewed in the direction of arrows IIA—IIA of FIG. 1.
Figure 2B:
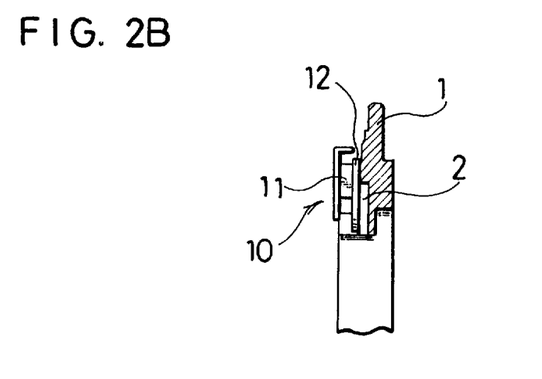
FIG. 2B is an axial fragmentary cross-sectional view of the rotor of FIG. 1, as viewed in the direction of arrows IIB—IIB of FIG. 1.

FIG. 2A illustrates the bush 1 as assembled with a needle bearing 10. FIG. 2B depicts needles 11 of the needle bearing 10 as maintained in contact with the bearing face 7 of the bush 1 via a race 12.

Figure 3:
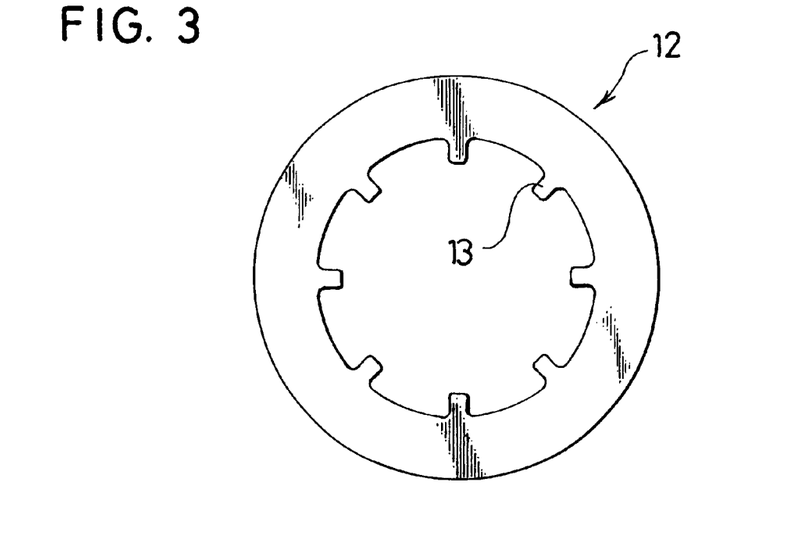
FIG. 3 is a front view of a race of a needle bearing.

Referring next to FIG. 3, the race 12 is provided on an annular inner peripheral portion thereof with inwardly-directed radial projections 13. Further, raised portions 9 are formed on the bearing surface at locations between the adjacent inlet portions 5 of the oil grooves 2. By fitting the projections 13 downwardly between the adjacent raised portions 9 from a point above the inlet portions 5, the positioning of the race 12 in the peripheral direction is achieved.

Figure 4:
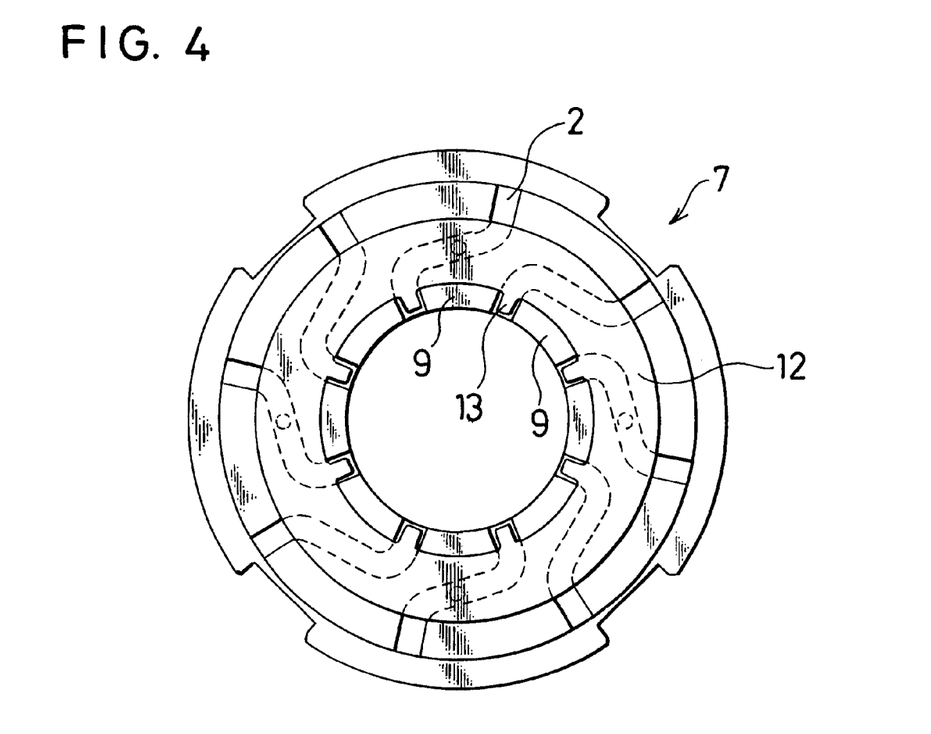
FIG. 4 is a front view of the rotor of FIGS. 1 and 2A and the race of FIG. 3 fitted on a bearing face of the rotor.
Figure 5:
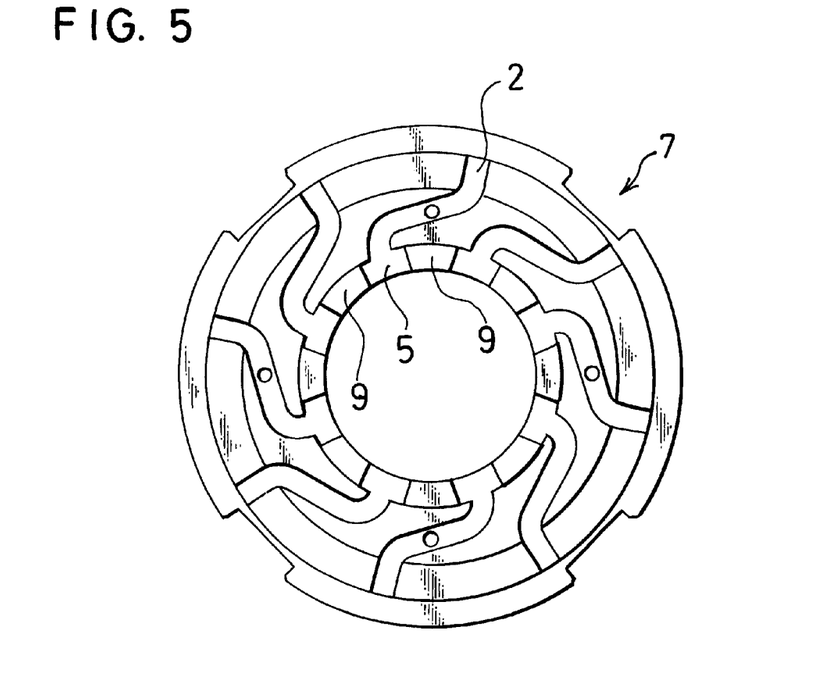
FIG. 5 is similar to FIG. 1, but depicts another modification of the rotor that oil grooves have broader inlet portions.

In FIG. 4, the projections 13 of the race 12 are fitted between the adjacent raised portions 9. As shown in FIG. 5, the raised portions 9 may be formed with wider intervals therebetween so that the inlet portions 5 of the oil grooves 2 are made greater than the width of the oil grooves 2. This modification can make the projections 13 wider accordingly, thereby permitting a reduction in the thickness of the race 12 while retaining the strength of the projections 13.

Figure 6:
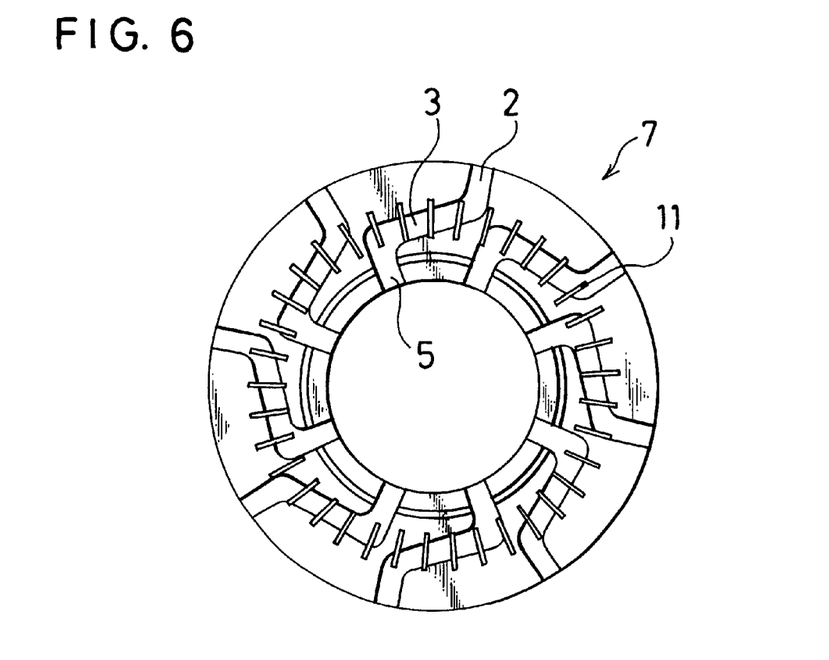
FIG. 6 is a diagram showing a positional relationship between the oil grooves of the rotor according to the first embodiment and needles.
Figure 7:
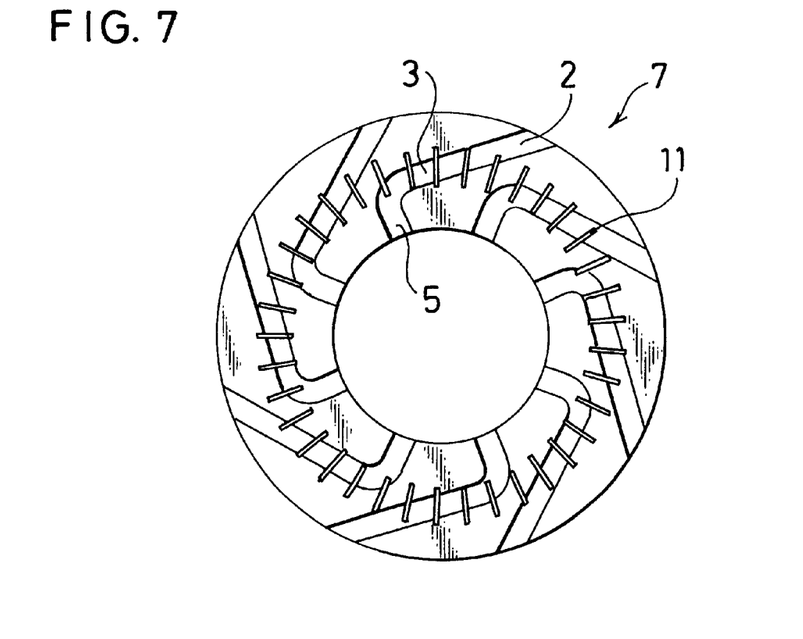
FIG. 7 is a diagram showing a positional relationship between oil grooves of a rotor according to a second embodiment of the present invention and needles.
Figure 8:
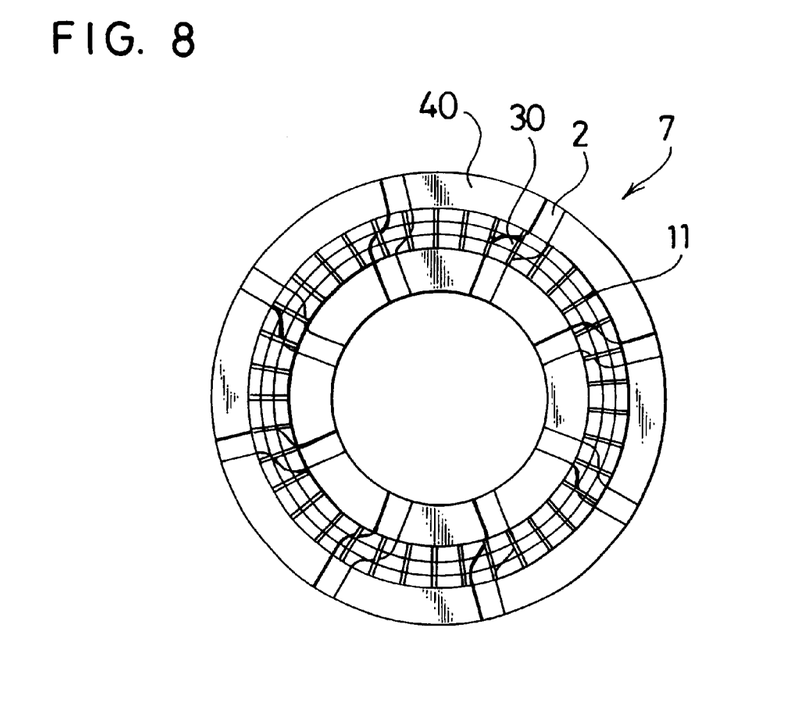
FIG. 8 is a diagram showing a positional relationship between oil grooves of a rotor according to a third embodiment of the present invention and needles.

FIGS. 6, 7 and 8 illustrate similar positional relationships between oil grooves and needles as in FIG. 14. FIG. 6 shows the positional relationship between the bearing face 7 and the needles 11 in the first embodiment illustrated in FIGS. 1 and 2. The needles 11 extend over the corresponding oil grooves 2, and along the entire circumference, the needles 11 and the oil grooves do not overlap completely.

FIGS. 7 and 8 illustrate the second and third embodiments, which are different from each other in the form of oil grooves 2. In each of these embodiments, the oil grooves and the needles do not overlap completely. In the second embodiment depicted in FIG. 7, a middle part 3 of each oil groove 2 extends straight in the direction of a tangent to a raceway circle. In the third embodiment shown in FIG. 8, each oil groove 2 does not have a part extending in the direction of a tangent to a raceway circle 40 of needles, but has an adequate bent portion 30 so that the needles 11 and the oil groove 2 do not overlap completely.

Figure 9:
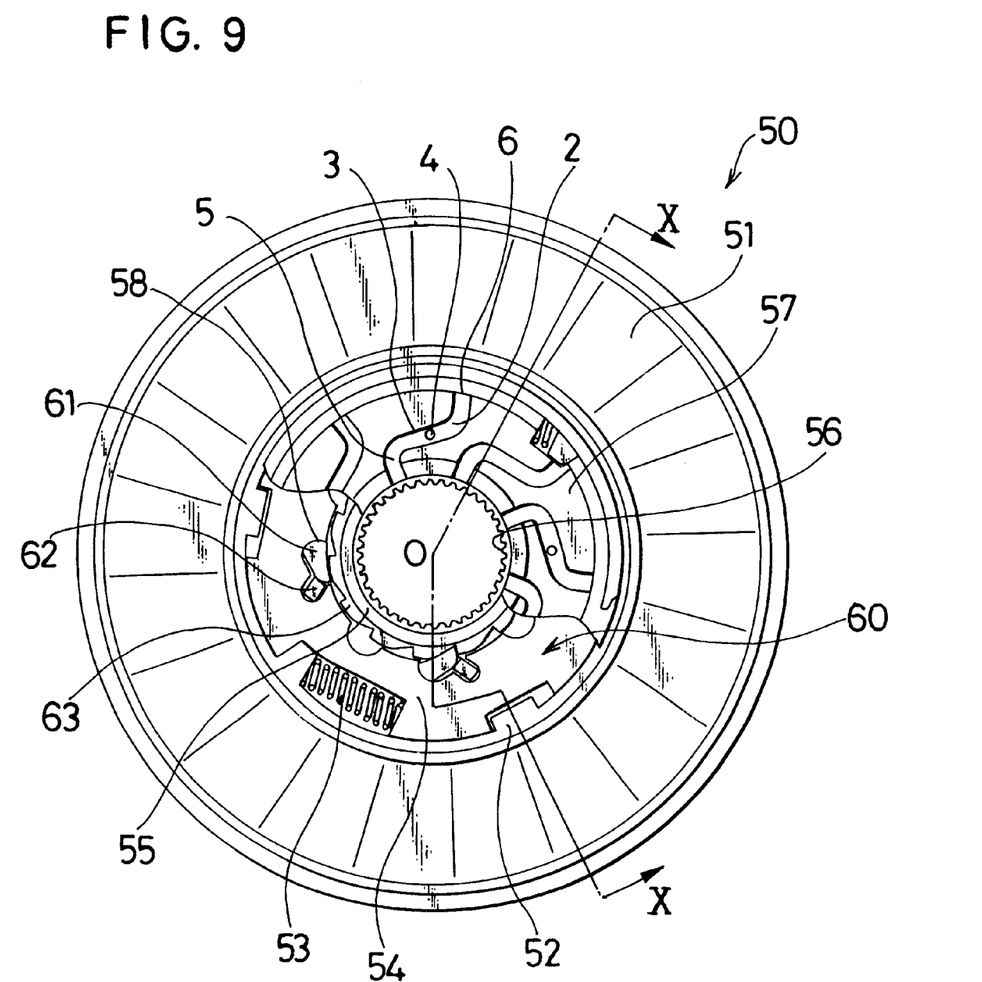
FIG. 9 is a front view of a rotor according to a fourth embodiment of the present invention as applied as a stator of a torque converter equipped with a ratchet-type one-way clutch.
Figure 10:
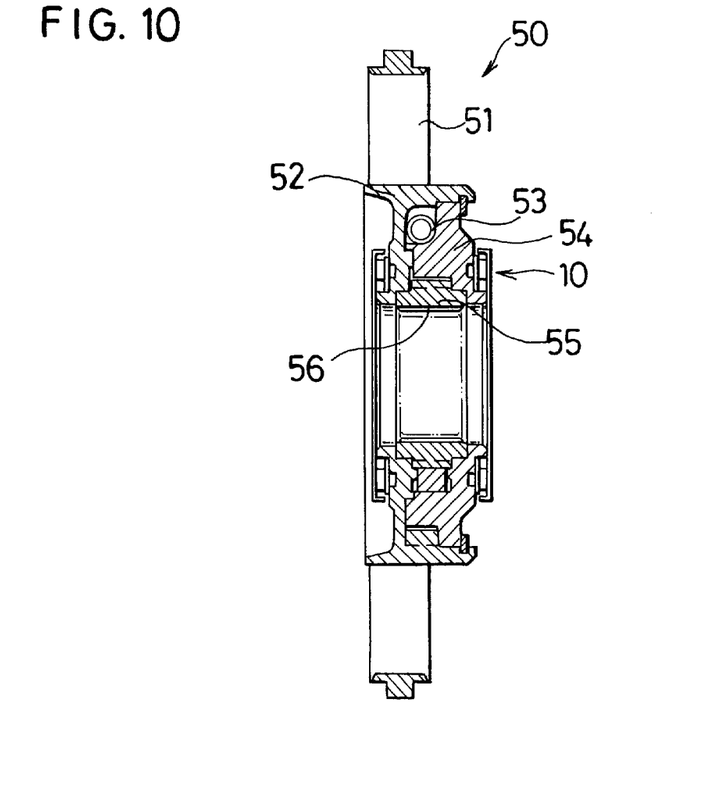
FIG. 10 is a cross-sectional view of the rotor of FIG. 9, as viewed in the direction of arrows X—X of FIG. 9.

In FIG. 9, the rotor according to the fourth embodiment of the present invention is applied to a stator 50 of a torque converter. FIG. 9 shows blades 51 of the stator, an inner peripheral portion 52 of the stator with the blades 51 attached thereto, an outer ring 54 assembled with the inner peripheral portion 52 of the stator, and an inner ring 55. The ratchet-type one-way clutch, which is designated at numeral 60, is arranged between the outer ring 54 and the inner ring 55. Between the inner peripheral portion 52 of the stator and the outer ring 54, dumping springs 53 are interposed. Numeral 56 indicates splines on an inner peripheral surface of the inner ring 55.

Also illustrated are a ratchet pawl member 61 inserted in an indentation 58 of the outer ring 54, a spring 62 biasing the pawl member 62 of the ratchet at a free end thereof, and cams 63 formed on an outer peripheral portion of the inner ring 55. In the fourth embodiment of FIG. 9, rotation of the inner peripheral portion 52 of the stator and the outer ring 54 in a counterclockwise direction brings the pawl member 61 into engagement with one of the cams 63, so that the inner ring 55 also rotates.

FIG. 9 shows that the inner peripheral portion 52 of the stator and a bearing face 57 on a side surface of the outer ring 54, said bearing face 57 being arranged for a needle bearing 10, are provided with oil grooves 2 described above with reference to FIG. 1 onwards. By cutting off a part of the bearing face 57, the ratchet-type one-way clutch 60 is shown in cross-section taken along the center.

Figure 11:
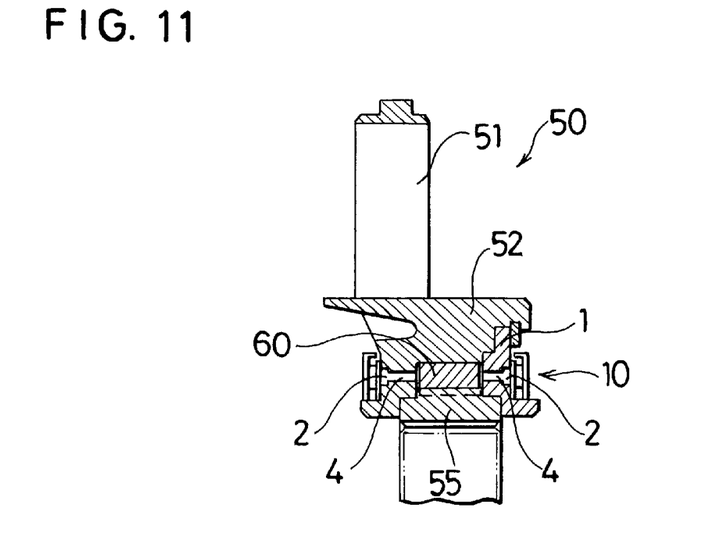
FIG. 11 is an axial fragmentary cross-sectional view of a rotor according to a fifth embodiment of the present invention.

With reference to FIG. 11, the rotator according to the fifth embodiment of the present invention will be described. An inner peripheral portion 52 of a stator is also used as an outer ring, a bush 1 is arranged on one of its side surfaces (the right-hand side surface in the drawing), and the bush 1 is in contact with a needle bearing 10. The inner peripheral portion 52 of the stator, which serves as the bush 1 and also as the outer ring, is provided, in a bearing surface maintained in contact with the needle bearing 10, with oil grooves 2 according to the present invention. FIG. 11 also illustrates that each oilway 4 axially extends from the bearing face to a clutch unit through the rotor.

This application claims the priority of Japanese Patent Application 2000-346460 filed Nov. 14, 2000, which is incorporated herein by reference.

What is claimed is:

1. A rotor supportable at a side surface thereof by a needle bearing, said side surface including a bearing face with lubricating oil grooves formed therein to be brought into contact with said needle bearing upon assembly, wherein said oil grooves are arranged in a positional relationship with needles of said needle bearing such that said oil grooves and said needles of said needle bearing do not completely overlap each other along an entire circumference in a direction of rotation wherein said oil grooves are each provided with a groove part extending substantially in a direction of a tangent to a raceway circle for said needles.

2. A rotor according to claim 1, wherein said oil grooves are open in at least one of inner and outer peripheral edges of said bearing face.

3. A rotor according to claim 1, which is a bush for a one-way clutch.

4. A rotor according to claim 3, wherein at least some of said oil grooves are each provided with an oilway axially extending from said bearing face and through said rotor.

5. A rotor according to claim 1, which is an inner portion of a stator of a torque converter.

6. A rotor according to claim 5, wherein at least some of said oil grooves are each provided with an oilway axially extending from said bearing face and through said rotor.

7. A rotor according to claim 1, which is an outer ring of a one-way clutch, said outer ring also serving as an inner peripheral portion of a stator of a torque converter.

8. A rotor according to claim 7, wherein at least some of said oil grooves are each provided with an oilway axially extending from said bearing face and through said rotor.

* * * * *